United States Patent [19]

Mogle

[11] 3,965,402

[45] June 22, 1976

[54] HEADREST PROPORTIONAL CONTROL FOR MOTORIZED WHEELCHAIR

[75] Inventor: Douglas H. Mogle, San Diego, Calif.

[73] Assignee: The United States of America as represented by the Secretary of the Navy, Washington, D.C.

[22] Filed: July 1, 1974

[21] Appl. No.: 484,383

[52] U.S. Cl. .................................. 318/55; 318/341; 200/DIG. 2

[51] Int. Cl.² ............................................ H02P 7/68

[58] Field of Search ............. 318/55, 305, 341, 349; 200/DIG. 2

[56] References Cited

UNITED STATES PATENTS

| | | | |
|---|---|---|---|
| 2,798,565 | 7/1957 | Rosenthal et al. | 318/55 UX |
| 3,100,860 | 7/1963 | Rosenthal | 318/55 |
| 3,229,059 | 1/1966 | Beatty | 200/DIG. 2 |
| 3,493,703 | 2/1970 | Finan | 200/DIG. 2 |
| 3,577,054 | 5/1971 | Banks | 318/305 X |
| 3,596,154 | 7/1971 | Gurwicz | 318/52 |
| 3,716,768 | 2/1973 | Mason | 318/349 X |
| 3,749,192 | 7/1973 | Karchak, Jr. et al. | 318/55 X |
| 3,803,473 | 4/1974 | Stich | 318/341 |

*Primary Examiner*—Robert K. Schaefer
*Assistant Examiner*—W. E. Duncanson, Jr.
*Attorney, Agent, or Firm*—R. S. Sciascia; G. J. Rubens; T. M. Phillips

[57] ABSTRACT

A head controlled mechanism for the proportional control of a driven device. A mechanism is provided whereby a control signal is generated proportional to the movement of the head of an operator to control the speed and direction of the driven device.

12 Claims, 5 Drawing Figures

HEADREST PROPORTIONAL CONTROL FOR MOTORIZED WHEELCHAIR

BACKGROUND OF THE INVENTION

Prior known means for the control of motorized wheelchairs do not provide proportional speed control nor do they provide an easy to use control for operators who have use only of their head and neck. Prior known control systems use on-off "joy stick" control in conjunction with various forms of linkage and actuator mechanisms or some form of tongue switches. These prior systems suffer from the difficulties of being unreliable, difficult to operate and difficult to maintain.

SUMMARY OF THE INVENTION

The present invention provides a proportional speed and direction control for a motorized wheelchair using movement of the operator's head only. The proportional control is by means of a two part movable headrest associated with switching means for generating variable duty cycle pulses that are fed to motor drive assembly. When both portions of the headrest are moved together the wheelchair will move forward or backward in a straight-line. By moving either of the portions individually the wheelchair is controlled to move either to the right or left. Speed is controlled by the amount of the movement of the headrest which is proportional to the amount of pressure applied to the headrest by the paraplegic.

Accordingly, an object of the invention is to provide a proportional speed and direction control for a wheelchair.

Another object of the invention is the provision of a proportional speed and direction control for a wheelchair wherein operation requires only minimum head and neck mobility of the operator.

A further object of the invention is the provision of a proportional speed and direction control for a wheelchair which is easily adapted to many operator requirements.

These and other features, objects, and advantages of the present invention will be readily appreciated as the same becomes better understood by reference to the following detailed description when considered in connection with the accompanying drawings.

DESCRIPTION OF THE PREFERRED EMBODIMENTS

Figure 1:
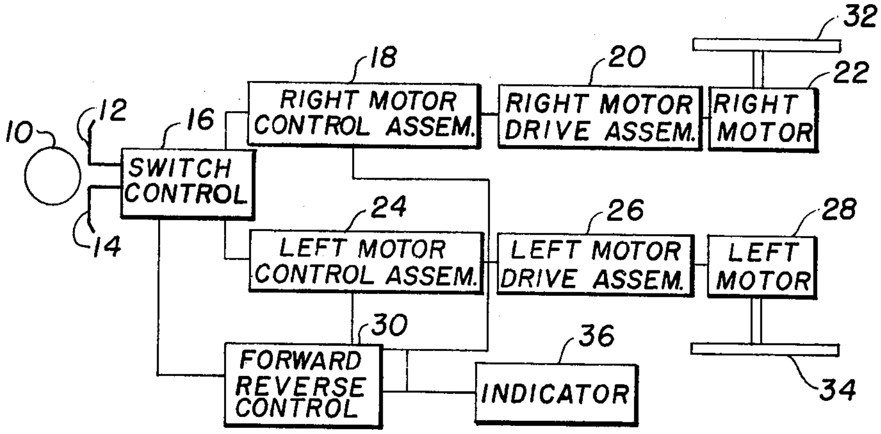
FIG. 1 is a simplified block diagram of the control system.
Figure 5:
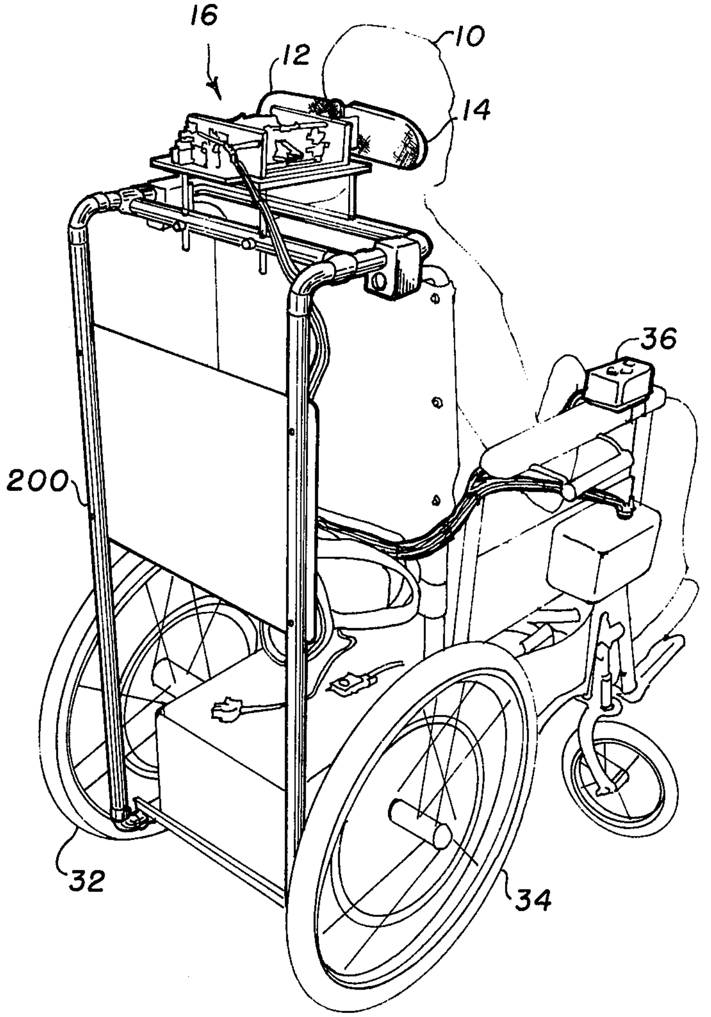
FIG. 5 shows the control system installed in a motorized wheelchair.

Referring now to FIG. 1 wherein there is shown a general diagram in block form of the major components of the control system. The head of the operator 10 pushes back against the right headrest 12 which should be shaped and positioned to properly receive the portion of the head that is most comfortable to the operator (FIG. 5). The movement of headrest 12 closes switches contained in direction control assembly 16. The number of switches closed will be directly proportional to the force with which operator head 10 pushes back on headrest 12. When headrest 12 is moved and at least one switch is closed control assembly 16 will feed a signal to left motor control assembly 24 which provides a variable duty cycle pulse train proportional to the number of switches that are closed. The variable duty cycle pulses from motor control assembly 24 are fed to the left motor drive assembly 26 which applies power to the left motor 28 to drive left wheel 34. In a similar manner when the operator's head moves headrest 14 directional control assembly 16 will provide a signal to right motor control assembly 18 which will produce a variable duty cycle pulse train proportional to the number of switches closed by movement of headrest 14. The variable duty cycle pulses from motor control assembly 18 are fed to motor drive assembly 20 which provides power to right drive motor 22 and right wheel 32. In this manner of moving the head in a rolling motion and pushing back to the right will cause the left wheel 34 to turn and the wheelchair will move in a right direction. Movement of the head to the left and back would cause the wheelchair to move in the left direction, in other words the direction in which the head is turned is the direction of the wheelchair movements. If the operator pushes back with equal pressure on both headrest 12 and 14 equal power will be applied to both wheels 32 and 34 and the wheelchair will move forward in a straight-line.

Forward, reverse, and "dead man" power control are provided by control circuit 30. As either one or both readrests 12 and 14 are pushed back the first thing that occurs is the "dead man" switch in directional control switch assembly 16 closes and applies power to the control circuits of left motor control assembly 24 and right motor control assembly 18 as well as sets forward reverse control circuit 30 to the forward state and illuminates the forward indicator in indicator box 36. As either one or both headrest 12 and 14 are pushed further back the forward reverse switch and directional control assembly 16 closes enabling control circuit 30 to change to reverse but does not cause the change while headrest 12 and 14 are moving back. As headrests 12 and 14 move further back power is applied to motors 22 and 28. The forward to reverse change is accomplished by allowing headrest 12 and/or 14 to go forward until the motors stop and the forward reverse switch opens (but not forward enough to cause the "dead man" switch to open). Opening the forward reverse control circuit 30 to reverse the power applied to the motor or motors associated with the particular headrest 12 or 14 when they are again pushed back far enough to cause power to be applied to the motors.

Figure 2:
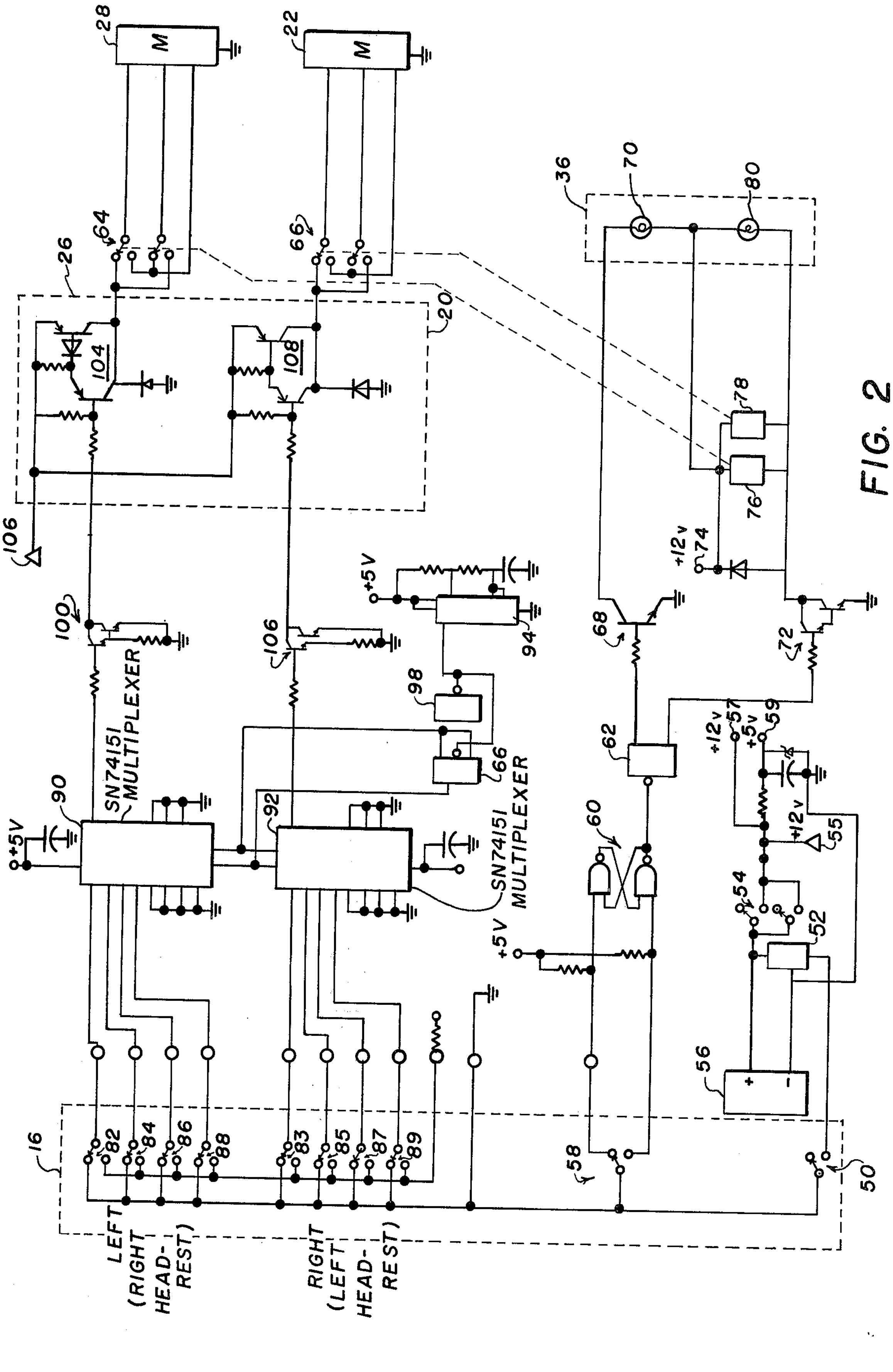
FIG. 2 is a schematic diagram of the control system.

Referring now to the schematic diagram of FIG. 2 where is shown a "dead man's" switch 50 which is in the off position when both headrests are in the neutral or at rest positions. When "dead man" switch 50 is closed relay coil 52 is energized to close power switch 54 to connect power source 56 to the various elements of the control circuit. In the embodiment shown two voltages are provided. Two 12 volt terminals 55 and 57 and a 5 volt terminal 59. After "dead man" control switch 50 has been closed additional movement of the headrest will move forward-reverse switch 58 from its normal position as shown to the other position to provide a voltage through switch debouncer 60 which consists of a set-reset flip-flop to the forward reverse flip-flop circuit 62. When switches 64 and 66 are in the position shown, motors 22 and 28 will be energized to run in the forward direction. With switch 58 in the position shown an output voltage is fed from flip-flop 12 to the base of transistor 68 which will cause forward indicator light 70 to light. When switch 58 is moved to the alternate position an output voltage will appear at the base of transistor 72 causing current to flow from terminal 74 through relay coils 76 and 78 to move relay switches 64 and 66 to their alternate positions. Motor 22 and 28 will then be energized to run in reverse direction. Reverse indicator light 80 will then be turned on to indicate the circuit is operating in the reverse direction. When switches 82 through 89 are in the positions shown they are connected to ground and there will be no output from either of multiplexers 90 or 92. Square wave pulses are supplied to multiplexers 90 and 92 by means of a square wave clock generator 94 to counters 96 and 98. Counters 96 and 98 are set to count to three and reset, this will provide a four square wave pulse cycle to multiplexers 90 and 92. When switch 82 is moved to its alternate position, one pulse out of four will be allowed to pass to the driver circuit 100 which supplies a control pulse to the driver 104. With the transistors of power driver 104 conducting power will flow from terminal 106 which is connected to the power terminal 55 of power switch 54 to drive motor 28. As additional switches 84, 86 and 88 are closed more square wave pulses (in proportion to the number of switches closed) will be fed through driver circuit 100 to power driver 26 to increase the speed of drive motor 28. In a similar manner switches 83, 85, 87, and 89 will provide a variable control through drive circuits 106 and 108 to drive motor 22.

Figure 3:
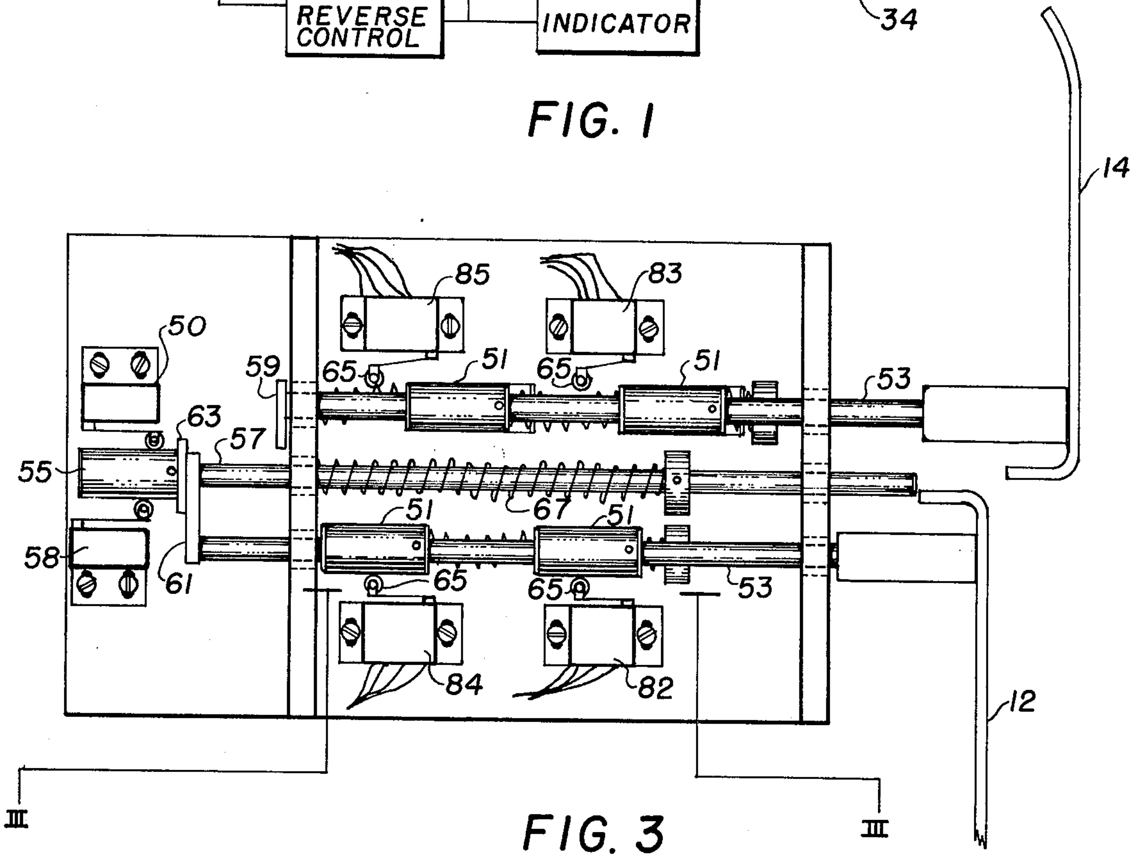
FIG. 3 is the top view of the control switch assembly.
Figure 4:
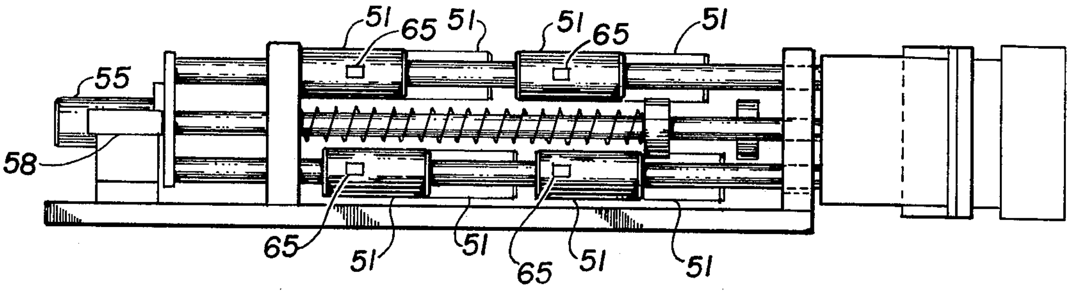
FIG. 4 is a side view of the control switch assembly taken along lines III—III of FIG. 2.

The control sequence of control switch assembly 16 is shown in FIGS. 3 and 4. There are 8 speed control switches, 82 through 89, (FIG. 2), power control or "dead man" switch 50 and forward-reverse switch 58. Only four of the speed control switches are visible in FIG. 3. Each speed control micro switch is actuated by means of a cylindrical cam 51 adjustably mounted on a pusher rod assembly 53. Micro switches 82 through 89 are actuated by cams 51 engaging micro switch rollers 65. Switches 50 and 58 are actuated by means of cam 55 adjustably mounted on pusher rod assembly 57. As shown in FIGS. 3 and 4 movement of the right headrest 12 causes the right cams 51, the right pusher plate 61 and the forward-reverse cam 55 to move. In like manner movement of the left headrest 14 causes the left cams 51, the left pusher plate 59, and cam 55 to move. Each of pusher plates 59 and 61 upon movement will cause cam 55 and rod assembly 51 to move because they will each engage pusher plate 63 which is attached to cam 55. When rod assembly 57 is moved in the manner described above, spring 67 will be compressed so that upon retraction of either of pusher plates 59 or 61 cam 55 will return to a position in which neither of switches 50 or 58 are engaged. As shown in FIGS. 3 and 4 headrest 12 is in the full back position so that cams 51 are actuating all the right side speed switches 82, 84, 86, and 88 (FIG. 2).

Movement of either headrest causes movement of the "dead man" power switch 50 and the forward-reverse switch 58 in sequence. As the headrest moves back power switch 50 is closed prior to forward-reverse switch 58 so that as the headrest moves forward and back, forward-reverse switch 58 can be actuated without effecting power switch 50. Cams 51 and 55 should be so adjusted that as either or both the headrest 12 and 14 move back from the rest position, power switch 50 closes first, forward-reverse switch 58 closes second, then the 8-speed control switches are closed one at a time.

As shown in FIG. 5 the control system is affixed to a wheelchair by means of frame 200. Switch assembly 16 should be so positioned with respect to the patient's head 10 that either of headrest 12 or 14 may be moved with as little motion as possible by the operator.

Obviously many modifications and variations of the present invention are possible in the light of the above teachings. It is therefore to be understood that within the scope of the appended claims the invention may be practiced otherwise than as specifically described.

What is claimed is:

1. A head controlled mechanism and system for the proportional control of a driven device comprising:

a. switch control circuit means having a plurality of switch means and a two part movable headrest means for engaging the head of an operator for actuating said switch means to provide output voltage signals in response to movement of said movable headrest, b. control circuit means coupled to said switch control circuit means for producing a variable duty cycle output control signal proportional to the voltage signals received from said switch control circuit means, c. a driven device coupled to said control circuit means and being driven in a direction and at speeds controlled by movement of said movable headrest means.

2. The control system of claim 1 wherein said driven device is a wheelchair.

3. The control system of claim 2 wherein said switch control means comprises two sets of switches, one of said two part headrest being associated with one set of said two sets of switches and the other of said two part headrest being associated with the other of said two sets of switches, and the output voltage signals being proportional to the number of switches closed by movement of said two part headrest.

4. The control system of claim 3 wherein there is a motor control circuit means and a drive motor associated with each set of switches.

5. The control system of claim 4 wherein each of said motor control circuit means includes a multiplexer circuit having first inputs coupled to one set of said switches and second inputs coupled to a source of counted clock pulses and an output for producing a variable duty cycle output signal proportional to the number of input voltages coupled to said first inputs.

6. The control system of claim 5 wherein the right and left direction of movement of said wheelchair is controlled by whichever of said two part headrest is moved.

7. The control system of claim 6 wherein said switch control circuit means further includes a forward-reverse switch positioned with respect to said movable headrest for controlling the forward and backward movement of said wheelchair by movement of said headrest means in either direction to actuage said forward-reverse switch.

8. The control system of claim 7 wherein the sequence of actuation is such that said forward-reverse switch is actuated prior to said sets of switches.

9. A controlled mechanism and system for the proportional control of a driven device comprising:

a. switch control means having a plurality of switch means and switch actuating means adapted for movement by an operator for providing a plurality of output voltage signals of equal value when more than one of said switch means is actuated, b. control circuit means coupled to said switch control circuit means for producing a variable duty cycle output control signal proportional to the number of output voltage signals received from said switch control circuit means, c. a driven device coupled to said control circuit means and being driven in a direction and at speeds controlled by said variable duty cycle control signal.

10. A head controlled mechanism and system for the proportional control of a driven device comprising:

a. switch control circuit means having a plurality of switch means and a movable headrest means for engaging the head of an operator for actuating said switch means to provide output voltage signals in response to movement of said movable headrest, b. control circuit means coupled to said switch control circuit means for producing a variable duty cycle output control signal proportional to the voltage signals received from said switch control circuit means, c. a driven device coupled to said control circuit means and being driven in a direction and at speeds controlled by movement of said movable headrest means.

11. A head controlled mechanism and system for the proportional control of a driven device comprising:

a. a movable headrest control means for providing control voltage signals proportional to movement of said headrest, b. control circuit means coupled to said headrest control means for producing a variable duty cycle output control signal proportional to the voltage signals received from said headrest control means, c. a driven device coupled to said control circuit means and being driven in a direction and at speeds controlled by movement of said headrest.

12. A head controlled mechanism for providing a plurality of control signals comprising:

a. a movable headrest for engaging the head of an operator, b. control signal generating means coupled to said headrest and being responsive to movement of said headrest for generating output control signals.

* * * * *